(12) United States Patent
Ohkawa (10) Patent No.: US 7,253,926 B2
(45) Date of Patent: Aug. 7, 2007

(54) IMAGE-PROCESSING APPARATUS, METHOD AND PROGRAM FOR OUTPUTTING AN IMAGE TO A PLURALITY OF FUNCTIONS

(75) Inventor: Mieko Ohkawa, Tokyo (JP)

(73) Assignee: Konica Corporation, Tokyo (JP)

( * ) Notice: Subject to any disclaimer, the term of this patent is extended or adjusted under 35 U.S.C. 154(b) by 945 days.

(21) Appl. No.: 10/342,710

(22) Filed: Jan. 15, 2003

(65) Prior Publication Data

US 2003/0137677 A1 Jul. 24, 2003

(30) Foreign Application Priority Data

Jan. 23, 2002 (JP) ............... 2002-014422

(51) Int. Cl.
*G06K 15/00* (2006.01)
(52) U.S. Cl. .............. 358/3.03; 358/1.13; 358/1.2; 358/3.05
(58) Field of Classification Search ............... 358/3.03, 358/487, 506, 403, 444, 448, 468
See application file for complete search history.

(56) References Cited

U.S. PATENT DOCUMENTS

| | | | |
|---|---|---|---|
| 5,126,850 A | * | 6/1992 | Kato ........................ 358/300 |
| 5,867,632 A | * | 2/1999 | Andree et al. ............. 358/1.9 |
| 5,956,152 A | * | 9/1999 | Yamada et al. ............. 358/412 |
| 6,055,067 A | * | 4/2000 | Matsuda et al. ............. 358/468 |
| 6,289,137 B1 | * | 9/2001 | Sugiyama et al. ........... 382/299 |
| 6,985,246 B2 | * | 1/2006 | Utsunomiya ............... 358/1.15 |

FOREIGN PATENT DOCUMENTS

| | | |
|---|---|---|
| JP | 61208363 | 9/1986 |
| JP | 07295527 | 10/1995 |
| JP | 2001251499 | 9/2001 |

* cited by examiner

*Primary Examiner*—King Y. Poon
*Assistant Examiner*—Jacky X. Zheng
(74) *Attorney, Agent, or Firm*—Lucas & Mercanti, LLP (57) ABSTRACT

There is described a compound apparatus, having a plurality of outputting functions including at least a copy function. The compound apparatus includes: an image-reading device to read an original image residing on a document so as to convert the original image into image data; a binary-coded image data generating section to generate binary-coded image data by applying a binary-coding processing to the image data; an image-data storing section to store the image data or the binary-coded image data; a designating section to designate an outputting function among the plurality of outputting functions; a resolution setting section to set an output-image resolution, based on an output resolution of the outputting function; and a resolution converting section to convert a resolution of either the image data or the binary-coded image data, stored in the image-data storing section, to the output-image resolution set by the resolution setting section.

8 Claims, 6 Drawing Sheets

| READING MODE | REFERENCE VALUE (%) |
|---|---|
| CHARACTER/ PHOTOGRAPH | 60 |
| CHARACTER | 80 |
| PHOTOGRAPH | 40 |
| PENCIL | 50 |

FIG. 4

| OUTPUTTING FUNCTION | RESOLUTION (dpi) |
|---|---|
| SCANNER | 600 × 600 |
| COPY | 300 × 200 |
| PRINTER | 300 × 300 |
| FACSIMILE | 200 × 100 |

IMAGE-PROCESSING APPARATUS, METHOD AND PROGRAM FOR OUTPUTTING AN IMAGE TO A PLURALITY OF FUNCTIONS

BACKGROUND OF THE INVENTION

The present invention relates to a compound apparatus having various functions, in which at least a copy function is included.

Conventionally, there has been well-known a compound apparatus having two or more specific functions among data accessing functions, such as image-outputting functions including a copying function, a printing function, a facsimile transmitting function, etc., and image-inputting functions, such as a scanner function, etc. According to such the compound apparatus, it has been possible to output an original image, which was read by using, for instance, the scanner function, by employing a desired outputting function selected from the copying function, the printing function and the facsimile transmitting function.

Conventionally, however, since output resolutions corresponding to the functions provided with the compound apparatus, such as the copying function, the printing function and the facsimile transmitting function, are generally different relative to each other, the original image should be read again corresponding to the resolution for the function currently employed, even if the same original image have already read for another function.

SUMMARY OF THE INVENTION

To overcome the abovementioned drawbacks in conventional compound apparatus, it is an object of the present invention to provide a compound apparatus, which makes it possible to alleviate processing burdens when outputting the same original image from outputting functions being different each other.

Accordingly, to overcome the cited shortcomings, the abovementioned object of the present invention can be attained by compound apparatus, an image-processing method and a program described as follow.

(1) A compound apparatus, having a plurality of outputting functions including at least a copy function, comprising: an image-reading device to read an original image residing on a document so as to convert the original image into image data thereof; a binary-coded image data generating section to generate binary-coded image data by applying a binary-coding processing to the image data read from the original image; an image-data storing section to store the image data, read from the original image, or the binary-coded image data, generated by the binary-coded image data generating section, therein; a designating section to designate an outputting function among the plurality of outputting functions; a resolution setting section to set an output-image resolution, based on an output resolution of the outputting function designated by the designating section; and a resolution converting section to convert a resolution of either the image data or the binary-coded image data, stored in the image-data storing section, to the output-image resolution set by the resolution setting section.

(2) The compound apparatus of item 1, further comprising: a resolution selecting section to select a specific output resolution out of a plurality of output resolutions established in advance; wherein the resolution converting section converts a resolution of either the image data or the binary-coded image data, stored in the image-data storing section, to the specific output resolution selected by the resolution selecting section, instead of the output resolution set by the resolution setting section.

(3) The compound apparatus of item 1, wherein, based on a ratio of the resolution of either the image data or the binary-coded image data and the output-image resolution set by the resolution setting section, the resolution converting section divides either the image data or the binary-coded image data into a plurality of pixel blocks, and then, applies a binary-coding processing to each of the plurality of pixel blocks so as to convert a resolution of either the image data or the binary-coded image data to the output-image resolution set by the resolution setting section.

(4) The compound apparatus of item 2, wherein, based on a ratio of the resolution of either the image data or the binary-coded image data and the specific output resolution selected by the resolution selecting section, the resolution converting section divides either the image data or the binary-coded image data into a plurality of pixel blocks, and then, applies a binary-coding processing to each of the plurality of pixel blocks so as to convert a resolution of either the image data or the binary-coded image data to the specific output resolution selected by the resolution selecting section.

(5) The compound apparatus of item 3, wherein the resolution converting section comprises a binary-coding reference value setting section to set a binary-coding reference value employed for the binary-coding processing.

(6) The compound apparatus of item 5, wherein the binary-coding reference value setting section establishes the binary-coding reference value, corresponding to the output-image resolution set by the resolution setting section.

(7) The compound apparatus of item 5, wherein the image-reading device comprises a reading mode selecting section to select a reading mode out of a plurality of reading modes provided in advance, corresponding to at least either a variable density image or a binary-coded image, and performs an image-reading operation based on the reading mode selected by the reading mode selecting section; and wherein the binary-coding reference value setting section establishes the binary-coding reference value, corresponding to the reading mode selected by the reading mode selecting section.

(8) The compound apparatus of item 5, further comprising an output-density setting section to set an output density of the outputting function designated by the designating section; wherein a binary-coding reference value setting section sets a binary-coding reference value, corresponding to the output density set by the output-density setting section.

(9) The compound apparatus of item 1, wherein the resolution converting section employs an error diffusion method for converting the resolution of either the image data or the binary-coded image data to the output-image resolution.

(10) The compound apparatus of item 9, wherein the resolution converting section selects the error diffusion method to be employed, corresponding to the output-image resolution and a reading mode, out of plural kinds of error diffusion methods provided in advance.

(11) An image-processing method, performed in a compound apparatus having a plurality of outputting functions including at least a copy function, comprising the steps of: reading an original image residing on a document so as to convert the original image into image data thereof; generating binary-coded image data by applying a binary-coding processing to the image data read from the original image; storing the image data, read from the original image, or the binary-coded image data, generated from the original image, in an image-data storing section; designating an outputting function among the plurality of outputting functions provided in the compound apparatus; setting an output-image resolution, based on an output resolution of the outputting function designated in the designating step; and converting a resolution of either the image data or the binary-coded image data, stored in the image-data storing section, to the output-image resolution set in the setting step.

(12) A program for conducting an image-processing method, to be executed in a compound apparatus having a plurality of outputting functions including at least a copy function, the image-processing method comprising the steps of: reading an original image residing on a document so as to convert the original image into image data thereof; generating binary-coded image data by applying a binary-coding processing to the image data read from the original image; storing the image data, read from the original image, or the binary-coded image data, generated from the original image, in an image-data storing section; designating an outputting function among the plurality of outputting functions provided in the compound apparatus; setting an output-image resolution, based on an output resolution of the outputting function designated in the designating step; and converting a resolution of either the image data or the binary-coded image data, stored in the image-data storing section, to the output-image resolution set in the setting step.

Further, to overcome the abovementioned problems, other compound apparatus, another image-processing method and another program, embodied in the present invention, will be described as follow:

(13) A compound apparatus, which has a plurality of functions including at least a copy function, characterized by comprising:
  image-reading means for reading an original image;
  binary-coded image generating means for generating binary-coded image by binary-coding the read image;
  image storing means for storing the binary-coded image or the read image read from the original image;
  designating means for designating a function as a outputting function among the plurality of functions;
  resolution setting means for setting an output-image resolution, based on a resolution of the outputting function designated by the designating means; and
  resolution converting means for converting a resolution of the image stored in the image storing means, to the output-image resolution set by the resolution setting means.

(14) An image-processing method in a compound apparatus having a plurality of functions including at least a copy function, characterized by comprising the processes of:
  a image-reading process for reading an original image;
  a binary-coded image generating process for generating binary-coded image by binary-coding the read image;
  an image storing process for storing the binary-coded image or the read image read from the original image;
  a designating process for designating a function as a outputting function among the plurality of functions, including the copy function, provided in the compound apparatus;
  a resolution setting process for setting an output-image resolution, based on a resolution of the outputting function designated by the designating means; and
  a resolution converting process for converting a resolution of the image stored in the image storing means, to the output-image resolution set by the resolution setting means.

(15) A program, with respect to a compound apparatus having a plurality of functions including at least a copy function, for realizing the functions of:
  a image-reading function for reading an original image;
  a binary-coded image generating function for generating binary-coded image by binary-coding the read image;
  an image storing function for storing the binary-coded image or the read image read from the original image;
  a designating function for designating a function as a outputting function among the plurality of functions;
  a resolution setting function for setting an output-image resolution, based on a resolution of the outputting function designated by the designating means; and
  a resolution converting function for converting a resolution of the image stored in the image storing means, to the output-image resolution set by the resolution setting means.

According to the present invention, the image data, read from the document, or the binary-coded image data, generated by binary-coding the image data, are stored in the image-data storing section. Then, the resolution of the binary-coded image data are converted on the basis of the resolution of the selected outputting function. Therefore, when the same original image is outputted by plural outputting functions corresponding to different output resolutions, it becomes possible to omit the processes of rereading the original image to cope with each of the outputting functions.

(16) The compound apparatus, described in item 13, characterized by further comprising:
  resolution selecting means for selecting an output resolution, and characterized in that
  the resolution converting means sets the output resolution, selected by the resolution selecting means, as an output-image resolution, instead the resolution of the designated output function.

According to the present invention, it becomes possible not only to output the original image in a desired resolution, but also to output plural images having resolutions different each other from the same original image, without rereading the original image for every resolution.

(17) The compound apparatus, described in item 13 or 16, characterized in that,
  based on a ratio of the resolution of the image stored in the image storing means and the output-image resolution set by the resolution setting means, the resolution converting means converts the resolution of the image to the output-image resolution by dividing the image into a plurality of pixel blocks and binary-coding each block.

According to the present invention, since the resolution of the binary-coded image data is converted to the output-image resolution on the basis of the resolution-converting ratio calculated from the ratio of the resolution of the binary-coded image data and output-image resolution, it becomes possible to output the image, in which features of the original image are little deteriorated.

(18) The compound apparatus, described in item 17, characterized in that,
  the resolution converting means provided with a binary-coding reference value setting means for setting a binary-coding reference value employed for the binary-coding processing.

According to the present invention, it is possible to vary the reference value when binary-coding the block. Therefore, it is possible to output the image while varying the characteristics of the original image. For instance, by varying the density as a reference value, the variable-density of the whole image can be changed.

(19) The compound apparatus, described in item 18, characterized in that, the binary-coding reference value setting means establishes the reference value, corresponding to the output-image resolution set by the resolution setting means.

According to the present invention, it becomes possible to set the reference value by the output-image resolution when binary-coding the block.

(20) The compound apparatus, described in item 18, characterized in that, the image-reading means provided with reading mode selecting means for selecting a reading mode being selectable corresponding to at least either a variable density image or a binary-coded image, and performs an image-reading operation based on the reading mode selected, and the reference value setting means establishes the reference value, corresponding to the reading mode selected.

According to the present invention, it is possible to establish the reference value employed for binary-coding the block, corresponding to the reading mode. Accordingly, it becomes possible to vary the reference value, corresponding to the characteristics of the image.

(21) The compound apparatus, described in item 18, characterized by further comprising, output-density setting means for setting an output density of the outputting function designated by the designating means; and characterized in that, the binary-coding reference value setting means sets a reference value, corresponding to the output density set by the output-density setting means.

According to the present invention, it becomes possible not only to output an image having a desired density from the original image, but also to output plural types of images, having output densities being different each other, without repeating the rereading operations for every image.

(22) The compound apparatus, described in anyone of items 13-21, characterized in that, the resolution converting means employs an error diffusion method for converting the resolution of the image to the output-image resolution.

According to the present invention, it becomes possible to reflect inclination of the block, which would disappear when the resolution of the binary-coded image data is converted to the output-image resolution, onto the other blocks residing in the periphery of the block. Therefore, it is possible to perform the resolution conversion processing with little deteriorating the density distribution in the output image, resulting in an improvement of the quality of the output image.

(23) The compound apparatus, described in item 22, characterized in that, the resolution converting means selects the error diffusion method to be employed, corresponding to the output-image resolution and a reading mode, out of plural kinds of error diffusion methods.

According to the present invention, it becomes possible to vary the output image, by changing the error diffusion method to be employed for binary-coding the blocks corresponding to the output-image resolution and the reading mode.

BRIEF DESCRIPTION OF THE DRAWINGS

Other objects and advantages of the present invention will become apparent upon reading the following detailed description and upon reference to the drawings in which.

DETAILED DESCRIPTION OF THE PREFERRED EMBODIMENT

Referring to the drawings, the compound apparatus, embodied in the present invention, will be detailed in the following. Incidentally, although the compound apparatus (the compound image-forming apparatus) having three outputting functions of the copying function, the printing function and the facsimile transmitting function is exemplified as an example apparatus embodied in the present invention, the scope of the present invention is not limited to the exemplified compound apparatus.

In the compound apparatus embodied in the present invention, the device having the scanner function reads the original image to store its binary-coded image data or the image data as they are in it, and when outputting the original image in a mode of the outputting function selected from the copying function, the printing function and the facsimile transmitting function, the resolution of the stored original image is converted to another resolution corresponding to the selected outputting function.

Figure 1:
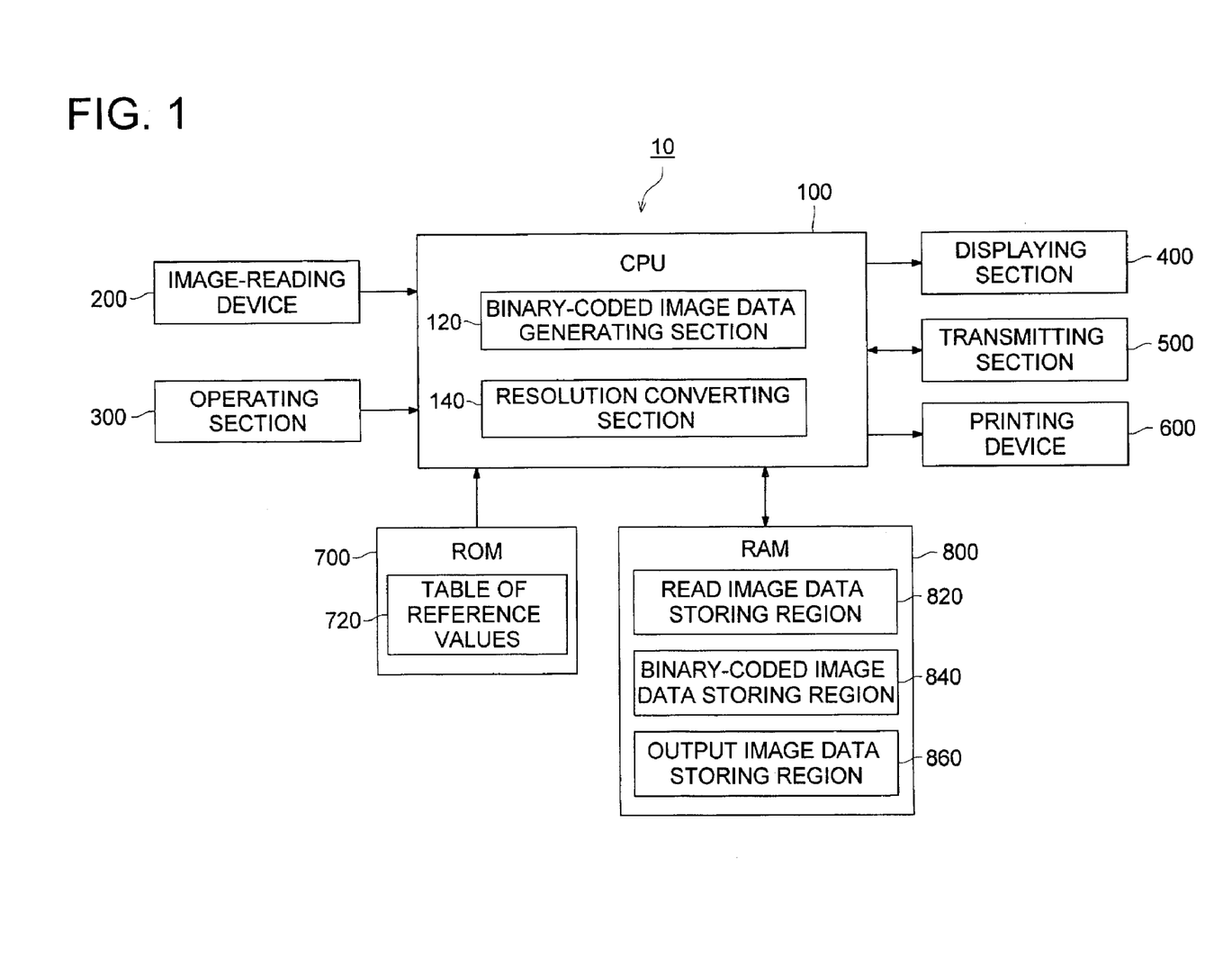
FIG. 1 shows an example of a functional block diagram of a compound apparatus embodied in the present invention.

FIG. 1 shows an example of the functional block diagram of compound apparatus 10 embodied in the present invention. As shown in FIG. 1, compound apparatus 10 comprises CPU (Central Processing Unit) 100, image-reading device 200, operating section 300, displaying section 400, transmitting section 500, printing device 600, ROM (Read Only Memory) 700 and RAM (Random Access Memory) 800.

CPU 100 controls each of functional sections constituting compound apparatus 10, overall operations of compound apparatus 10, etc. Concretely speaking, CPU 100 performs various processing operations based on various kinds of controlling programs and data stored in ROM 700, etc. with respect to the operations to be performed in each section, or based on the information transferred from other functional sections constituting compound apparatus 10, and controls the operations of compound apparatus 10 by outputting command signals to the functional section concerned.

Further, CPU 100 conducts various kinds of functions embodied in the present invention. Especially, hereinafter, a functional section for generating binary-coded image data and another functional section for converting an input resolution of read image data to an output resolution of outputted image data are referred to as binary-coded image data generating section 120 and resolution converting section 140, respectively.

Image-reading device 200 comprises, for instance, a light source, CCD (Charge Coupled Device), etc., so as to read the original image by optically scanning a photographic image or a document to detect light reflected or transmitted from/through it, and then, by converting the detected signals to digital image data.

Operating section 300 is provided with, for instance, various kinds of operating buttons, to each of which an individual function is allotted, and outputs status signals, indicating the pushed button, etc., to CPU 100. The user of compound apparatus 10 inputs an operation command by pushing the operating button concerned. The changeover of outputting functions, such as "copier", "printer" and "facsimile", the selection of a reading mode when reading the document, the designation of output density of the image when outputting the image, the designation of output resolution of the image when outputting the image, the designation of a number of sheets or a dialing operation of a facsimile number, the start command for outputting copies or a facsimile transmission, or the halt command for outputting copies or a facsimile transmission can be achieved by operation the operating buttons equipped in operating section 300. Incidentally, it is also possible to design compound apparatus 10 so that the abovementioned inputting operations can be achieved by selecting one of areas displayed on displaying section 400 detailed later.

Displaying section 400 serves as a notifying means for notifying the user of various kinds of messages including a message for urging the user to conduct the inputting operation for compound apparatus 10. The displayed information are renewed in response to the inputting operation achieved by pushing the operating buttons as mentioned in the above. Further, displaying section 400 comprises a liquid-crystal display, etc. CPU 100 outputs display signals, corresponding to the message to be displayed, to displaying section 400, and controls displaying section 400 so as to display the message on it.

Transmitting section 500 comprises a MODEM (Modulator/Demodulator) or a TA (Terminal Adaptor), etc., and CPU 100 conducts controlling operations for communicating with external apparatuses on the network, such as an Internet, LAN, WAN, etc., through transmitting section 500 and the communication lines, such as, telephone lines, ISDN lines, wireless communication lines, exclusive communication lines, CATV lines, etc. Further, transmitting section 500 conducts bilateral facsimile transmissions in accordance with the G3 (Group 3) standard or the G4 (Group 4) standard, etc.

Under the controlling actions conducted by CPU 100, printing device 600 prints the image on a sheet-type recording medium, based on the image data read as a printing object or the other data received from the external apparatus through transmitting section 500, while conducting the conveying operation of the sheet-type recording medium.

An initializing program for conducting various kinds of initial setting operations, for inspecting hardware or for loading necessary programs is stored in ROM 700. CPU 100 executes the initializing program when the power of compound apparatus 10 is turned ON, so as to initialize the operating environment of compound apparatus 10.

Further, various kinds of controlling programs pertaining to the operations in each of the sections constituting compound apparatus 10 or the other programs for conducting various kinds of functions provided in compound apparatus 10 are stored in ROM 700. Still further, in order to conduct the functions embodied in the present invention, "Table of Reference Values", detailed later, is also stored in ROM 700.

RAM 800 is provided with a storing region in which various kinds of programs to be executed by CPU 100 and the data pertaining to those programs are temporarily stored. Further, in order to conduct the functions embodied in the present invention, RAM 800 is also provided with read image data storing region 820 for storing the image data directly read by image-reading device 200, binary-coded image data storing region 840 for storing the binary-coded image data generated by binary-coding the image data directly read by image-reading device 200 and output image data storing region 860 for storing the output image data whose resolution is converted from that of the binary-coded image data, based on the output resolution required for the selected outputting function.

Referring to the flowchart shown in FIG. 2, the operations of compound apparatus 10, having the configuration mentioned in the above, will be detailed in the following.

Figure 2:
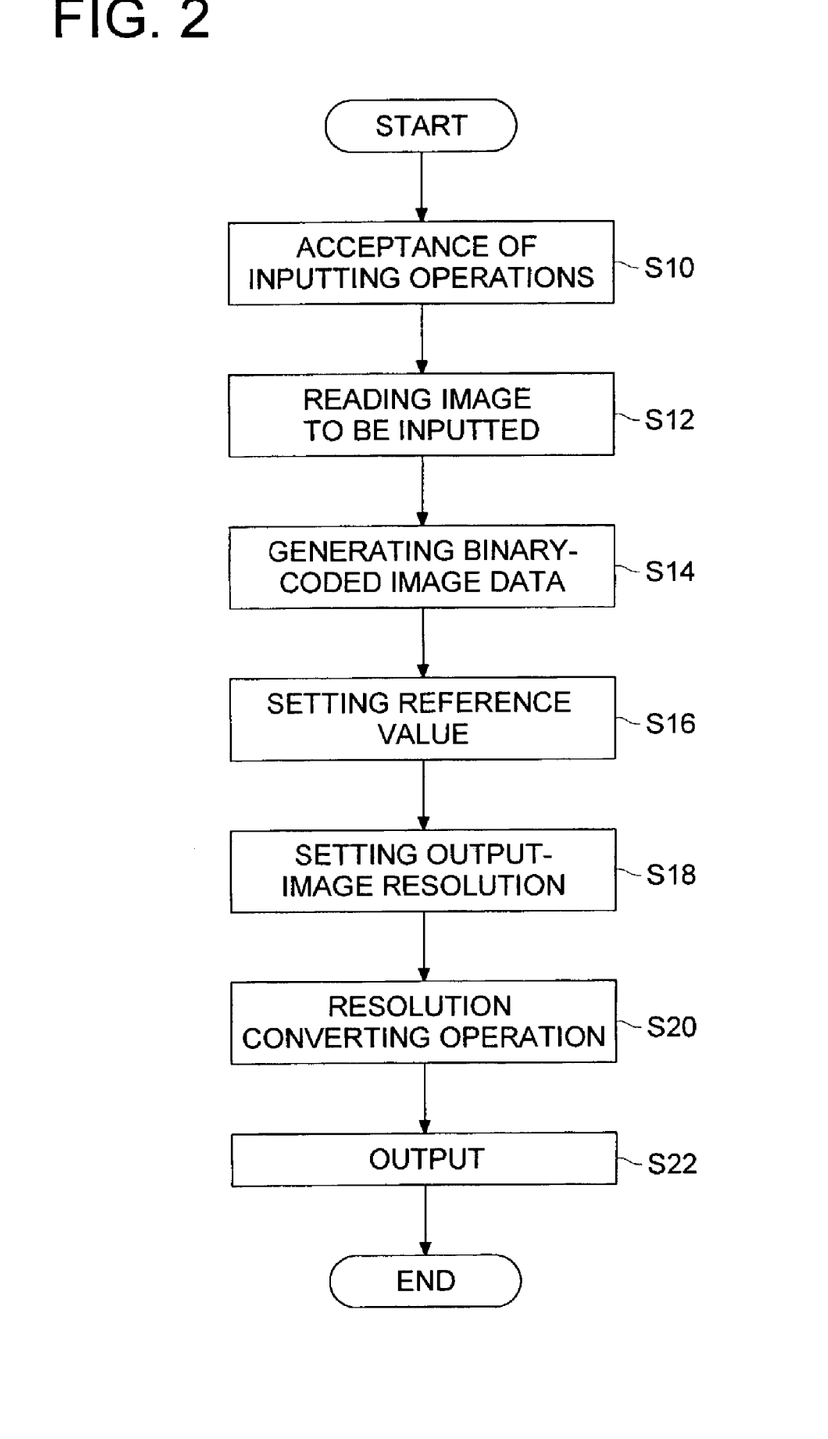
FIG. 2 shows a flowchart of exemplified operations performed in a compound apparatus embodied in the present invention.

As shown in FIG. 2, initially, CPU 100 accepts various kinds of inputting operations, such as a selection of the desired function performed by the user, an inputting operation of setting items, etc., (step 10). For instance, various kinds of inputting operations can be conducted by means of the push buttons arranged on the operation panel disposed at an arbitral position over compound apparatus 10, the buttons or icons displayed on the displaying screen, etc.

In step 10, CPU 100 waits for the selecting operation of the output function and the inputting operation of the selected mode for reading the original image.

Incidentally, the mode for reading the original image can be selected from four modes of "character/photograph mode", "character mode", "photograph mode" and "pencil mode", and an appropriate mode is selected corresponding to the features and structures of the original image. The case, in which "facsimile" (namely, facsimile transmission) is selected as the outputting function and "character mode" is selected as the mode for reading the original image, will be detailed in the following.

When CPU 100 accepts the selecting operation of the outputting function and the reading mode, CPU 100 controls operations performed in image-reading device 200 so as to read the original image in accordance with the selected reading mode (step 12). In addition, at the same time, CPU 100 revises read image data storing region 820 with the image data read from the original image.

Then, binary-coded image data generating section 120 generates binary-coded image data from the image data read from the original image (step 14).

Concretely speaking, binary-coded image data generating section 120 analyzes information of each of dots included in the image data read from the original image, and then, performs the processing operation for generating binary-coded image data in which the dot information concerned are converted to bit information. In other words, binary-coded image data generating section 120 generates the binary-coded image data in such a manner that a certain dot information, having a density level higher than the reference density level established in advance, is set at "1", while a certain dot information, having a density level lower than the reference density level, is set at "0". Further, at this time, binary-coded image data generating section 120 revises binary-coded image data storing region 840 with the binary-coded image data generated in the above process.

Next, CPU 100 establishes the reference value to be employed when conducting the resolution converting processing, detailed later, (step 16). Concretely speaking, CPU 100 establishes the reference value in accordance with the selected reading mode, while referring to table of reference values 720.

Figure 3:
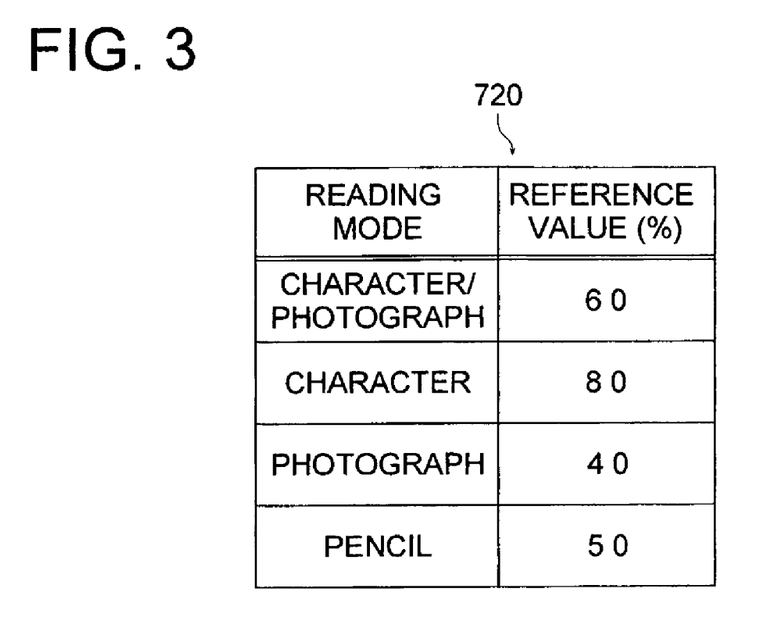
FIG. 3 shows an example of table of reference values.

FIG. 3 shows an example of table of reference values 720. As shown in FIG. 3, table of reference values 720 is a kind of data table in which each of the modes of "character/photograph mode", "character mode", "photograph mode" and "pencil mode" is correlated with each of the reference values (%). Accordingly, in step 16, referring to table of reference values 720, CPU 100 establishes the reference value utilized for the resolution converting processing, detailed later, at the reference value of 80%, which is stored at a position correlated with the reading mode of "character mode".

Figure 4:
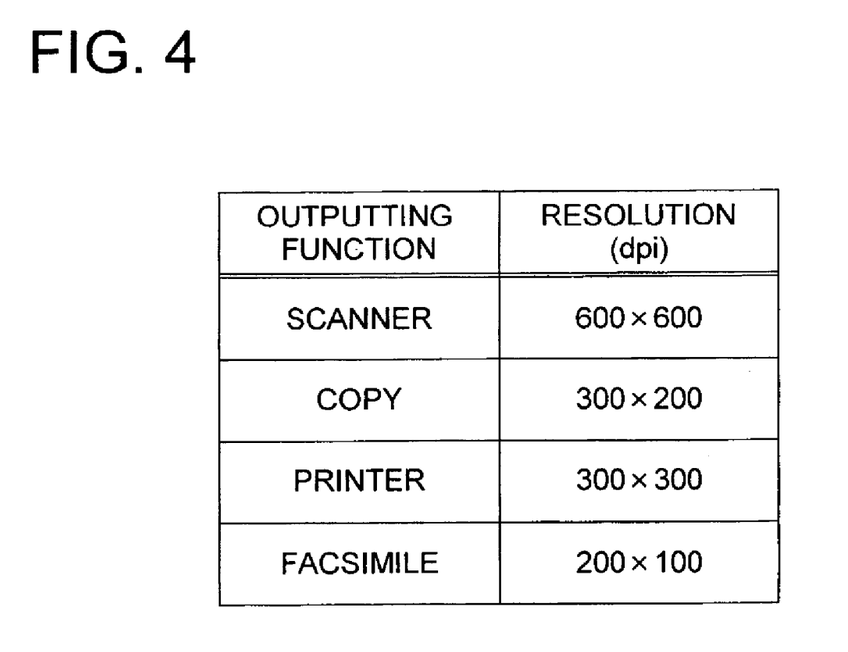
FIG. 4 shows an example of the resolutions each of which corresponds to each of inputting/outputting functions of a compound apparatus embodied in the present invention.

Successively, CPU 100 establishes the output resolution of the output image in accordance with the resolution corresponding to the selected outputting function (step 18). FIG. 4 shows an example of the resolutions each of which corresponds to each of inputting function and outputting functions. As shown in FIG. 4, in the example embodied in the present invention, the input resolution corresponding to the inputting function of "scanner" is 600×600 dpi, and for instance, the output resolution corresponding to the outputting function of "copier" is 300×200 dpi. In other words, CPU 100 establishes the output resolution of 200×100 dpi, corresponding to the outputting function of "facsimile" selected by the user, as a resolution of the output image in step 18.

Figure 5:
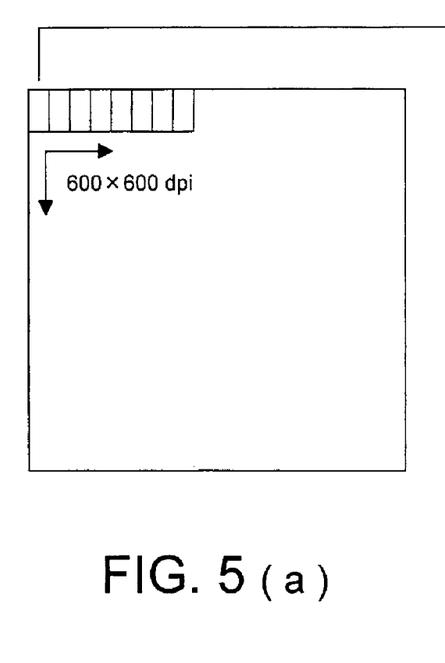
FIG. 5 shows an explanatory schematic diagram for explaining the process of the resolution converting operation.

Then, resolution converting section 140 performs the resolution converting operation for converting the current resolution of the binary-coded image data to the output resolution established by CPU 100 (step 18). Referring to FIG. 5, the resolution converting operation will be detailed in the following. Incidentally, FIG. 5 shows explanatory schematic diagram for explaining the process of the resolution converting operation.

Initially, resolution converting section 140 calculates a number of pixels to be included in one block, based on the ratio of the resolution of the binary-coded image data read from the original image (namely, the input resolution corresponding to the inputting function of "scanner") and the output resolution established by CPU 100. Successively, resolution converting section 140 divides the binary-coded image data into blocks each of which includes the calculated number of pixels, as shown in FIG. 5.

Concretely speaking, since the input resolution of inputting function of "scanner" is 600×600 dpi and the output resolution of the outputting function of "facsimile" is 200×100 dpi, the binary-coded image data are divided into blocks each of which includes 3×6 pixels as a unit block.

Successively, resolution converting section 140 applies the binary-coding processing to each of the blocks divided. Concretely speaking, resolution converting section 140 calculates a ratio between numbers of black pixels and the total pixels included in the block concerned. For instance, since a number of the black pixels is 8 pixels of 16 total pixels in the block having a pixel pattern as shown in section (b) of FIG. 5, resolution converting section 140 calculates a ratio of black pixels as being 50%.

Further, resolution converting section 140 compares the calculated ratio of black pixels, included in the block concerned, with the reference value established in step 16, so as to establish "0" (in this case, indicating a white pixel) to the pixel data equivalent to the block concerned when determining that the calculated ratio of black pixels does not exceed the reference value, or to establish "1" (in this case, indicating a black pixel) to the pixel data equivalent to the block concerned when determining that the calculated ratio of black pixels exceeds the reference value. Accordingly, since the reference value is established at 80% in step 16, resolution converting section 140 sets the pixel data, equivalent to the block concerned, at white ("0"), as shown in section (c) of FIG. 5.

By repeating the abovementioned processing, the output image data, having the output resolution converted from the input resolution of the binary-coded image data, can be generated. In addition, at this time, resolution converting section 140 revises output image data storing region 860 with the output image data generated by the abovementioned process.

When the resolution converting operation for the binary-coded image data concerned is completed, CPU 100 controls the functional section with respect to the selected outputting function so as to output the image based on the output image data (step 22). Accordingly, the output image data concerned are transmitted via facsimile.

Figure 6:
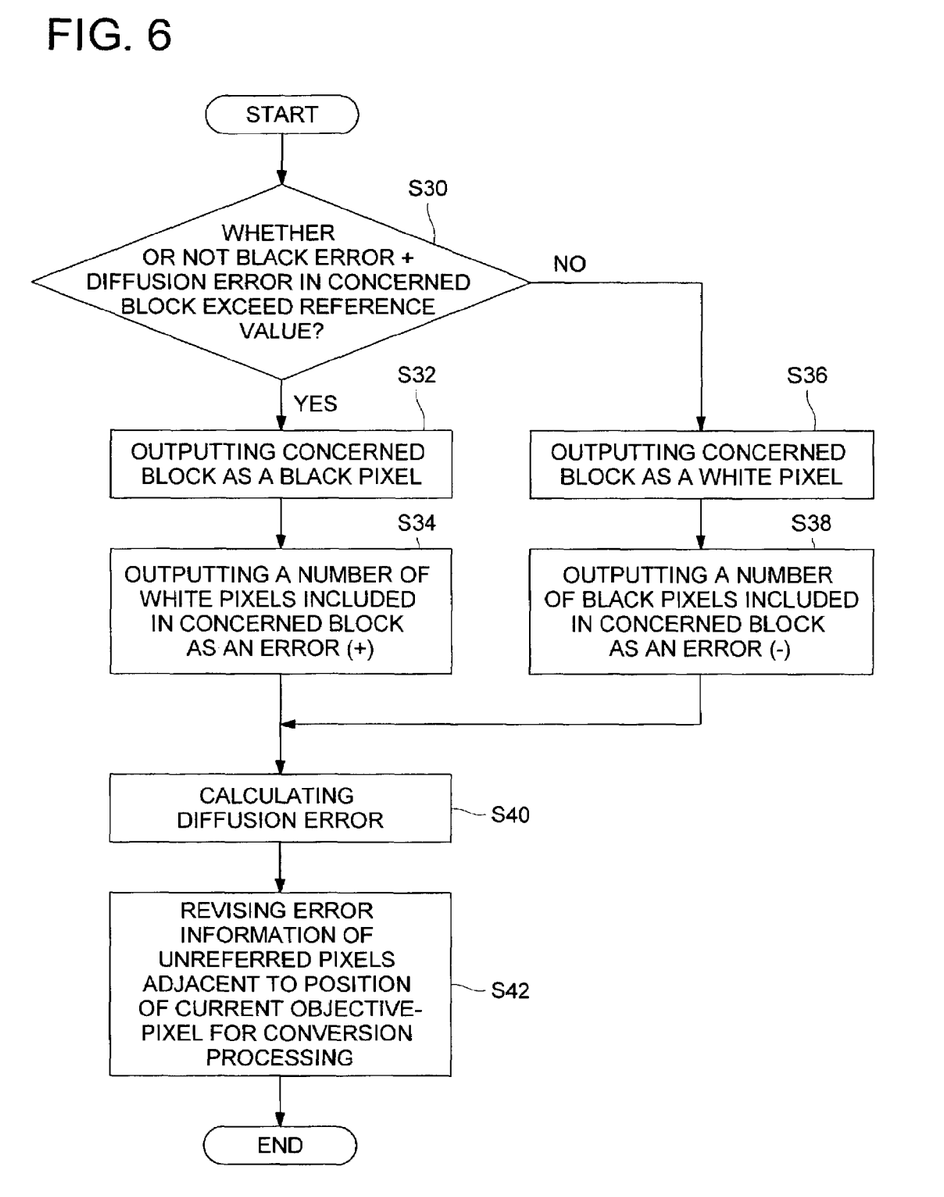
FIG. 6 shows a flowchart of exemplified operations of the error diffusion method performed by the CPU.

Incidentally, when, for instance, the "photograph mode" is selected as the mode for reading the original image, it is also applicable that the error-diffusion method is employed for binary-coding operation in the resolution converting processing mentioned in the above. FIG. 6 shows a flowchart of operations performed in resolution converting section 140, when the "photograph mode" is selected as the mode for reading the original image.

As shown in FIG. 6, resolution converting section 140 calculates a number of pixels to be included in one block, based on the ratio of the resolution of the binary-coded image data read from the original image and the output resolution established by CPU 100. Successively, resolution converting section 140 divides the binary-coded image data into blocks each of which includes the calculated number of pixels. Then, resolution converting section 140 calculates a sum of the black pixels included in one block and the diffusion errors established in a manner detailed later. Further, resolution converting section 140 compares the calculated sum value with the reference value (step S30), so as to establish "1" to the pixel data equivalent to the block concerned when determining that the calculated sum value exceeds the reference value (step S32).

Successively, resolution converting section 140 establishes a number of white pixels (namely, a number of pixels to be converted to black pixels), among the total number of pixels included in the block concerned, into error information (step S34).

Further, in step S30, resolution converting section 140 establishes "0" to the pixel data equivalent to the block concerned when determining that the calculated sum value does not exceed the reference value (step S36).

Successively, resolution converting section 140 establishes a number of black pixels (namely, a number of pixels to be converted to white pixels), among the total number of pixels included in the block concerned, into error information (step S38).

When the error information is established in step S34 or step S38, resolution converting section 140 calculates diffusion errors (step S40).

Figure 7:
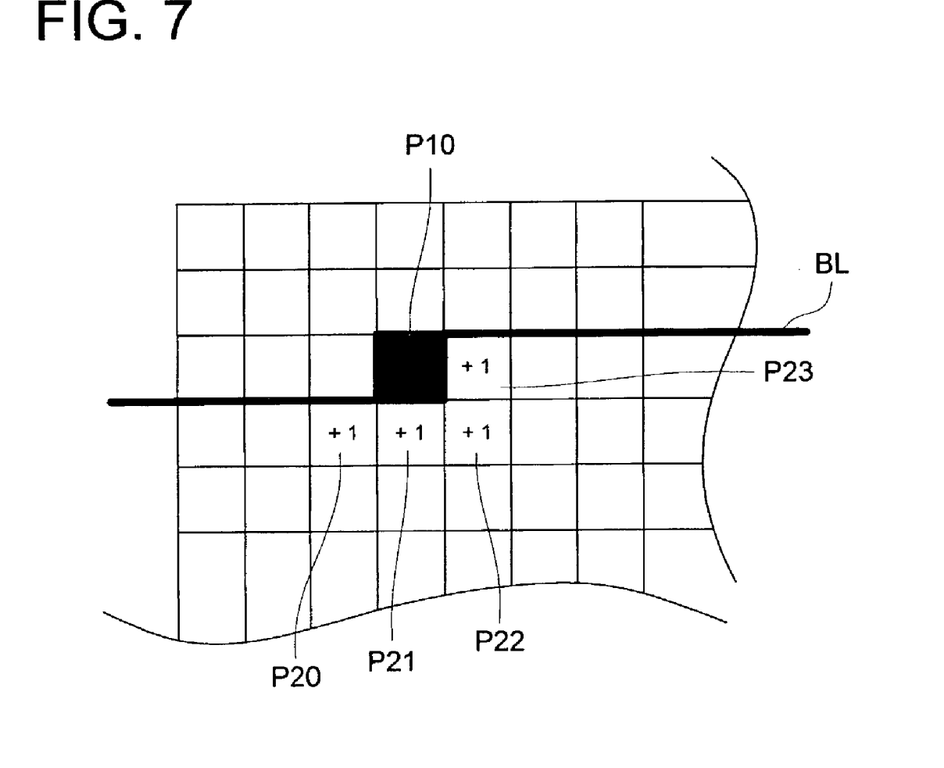
FIG. 7 shows an explanatory drawing for explaining the error diffusion method employed in the present invention.

Now, referring to FIG. 7, the error diffusion method will be detailed in the following. In FIG. 7, each of rectangular areas indicates each of pixels of the output image data (namely, each of blocks in the binary-coded image data). The pixels residing above borderline BL are already converted pixels, pixel P10 filed with black color is a currently referred objective-pixel for conversion processing and other pixels are to be referred later.

Concretely speaking, according to the error diffusion method applied to pixel P10, being an objective-pixel for conversion processing, shown in FIG. 7, values, into which the error information calculated in step S34 or step S38 is equally divided, are allotted to pixels P20, P21, P22, P23, which are located in the vicinity of the current objective-pixel for conversion processing and to be referred later. For instance, if the error information is four, resolution converting section 140 allots +1 to each of pixels P20, P21, P22, P23, being unreferred pixels. The allotted diffusion error information are temporarily stored in, for instance, RAM 800, and resolution converting section 140 determines the conversion objective pixel information, referring to the diffusion error concerned. Incidentally, the scope of the error diffusion method is not limited to the abovementioned method. It is also applicable that one of the various kinds of diffusing methods, such as the method in which errors are diffused to the unreferred pixels located in a region narrower than that of the abovementioned example, the method in which errors are diffused to the unreferred pixels distributing in a wide region, is selected as needed.

As described in the above referring to FIG. 7, resolution converting section 140 revises the error information of the unreferred pixels concerned, after calculating the diffusion errors to be set for the unreferred pixels adjacent to the position of the current objective-pixel for conversion processing in the output image data (step S42).

According to the compound apparatus as described in the foregoing, by storing the binary-coded image data of the original image, it becomes possible to output the original image through each of various kinds of outputting functions whose resolutions are different relative to each other, without rereading the original image corresponding to each of the outputting resolutions. Therefore, when the same original image is outputted by plural outputting functions corresponding to different output resolutions, it becomes possible to omit the processes of rereading the original image to cope with each of the outputting functions.

Concretely speaking, for instance, in case that the original image, which is already transmitted via facsimile, is also outputted via copy function, only by selecting the outputting function of "copy", it is possible to convert the resolution of the stored binary-coded image data to the output resolution corresponding to the outputting function of "copy" so as to output the copy of the original image without rereading the original image.

Incidentally, the scope of the present invention is not limited to the compound apparatus, embodied in the present invention, described in the foregoing. The disclosed embodiment can be adaptively modified by a skilled person without departing from the spirit and scope of the invention.

For instance, although binary-coded image data generating section 120 converts the read image into the binary-coded image data, which are further processed in the later stages, in the compound apparatus embodied in the present invention, it is also applicable that the multiple-valued data are processed in the later stages as they are without performing the binary-coding processing in binary-coded image data generating section 120. In this case, however, it is necessary such the processing that resolution converting section 140 calculates an average value of gradation data of the pixels included in each block, and "1" (namely, a black color, in this case) is established when the calculated average value is equal to or greater than a predetermined threshold level, while "0" (namely, a white color, in this case) is established when the calculated average value is smaller than the predetermined threshold level.

Further, it is also applicable such a configuration that the resolution of the output image is designated and inputted into compound apparatus 10 via a manual operation. For instance, an operation inputting means, such as a push button, etc., corresponding to the resolution-setting processing of the output image, is provided so that the resolution of the output image can be inputted via the operation inputting means. CPU 100 conducts the resolution-converting processing on the basis of the output resolution inputted via the operation inputting means when converting the binary-coded data to the output image data.

Still further, it is also applicable such a configuration that the density of the output image is designated and inputted into compound apparatus 10 via a manual operation. For instance, an operation inputting means, such as a push button, etc., corresponding to the density-setting processing of the output image, is provided so that the density of the output image can be inputted via the operation inputting means. CPU 100 establishes the binary-coding reference value employed for the resolution-converting processing on the basis of the output density inputted via the operation inputting means.

According to the abovementioned configuration, even when plural types of images, having output resolutions and/or output densities being different relative to each other, are outputted from the same original image, it is possible to outputs such the different plural types of images, having desired output resolutions and/or desired output densities, without repeating the rereading operations for every image.

As described in the foregoing, according to the present invention, the following effects can be attained.

(1) In a compound apparatus embodied in the present invention, the image data, read from the document, or the binary-coded image data, generated by binary-coding the image data, are stored in the image-data storing section. Then, the resolution of the binary-coded image data are converted on the basis of the resolution of the selected outputting function. Therefore, when the same original image is outputted by plural outputting functions corresponding to different output resolutions, it becomes possible to omit the processes of rereading the original image to cope with each of the outputting functions.

(2) It becomes possible not only to output the original image in a desired resolution, but also to output plural images having resolutions different each other from the same original image, without rereading the original image for every resolution.

(3) Since the resolution of the binary-coded image data is converted to the output-image resolution on the basis of the resolution-converting ratio calculated from the ratio of the resolution of the binary-coded image data and output-image resolution, it becomes possible to output the image, in which features of the original image are little deteriorated.

(4) It is possible to vary the reference value when binary-coding the block. Therefore, it is possible to output the image while varying the characteristics of the original image. For instance, by varying the density as a reference value, the variable-density of the whole image can be changed.

(5) It becomes possible to set the reference value by the output-image resolution when binary-coding the block.

(6) It is possible to establish the reference value employed for binary-coding the block, corresponding to the reading mode. Accordingly, it becomes possible to vary the reference value, corresponding to the characteristics of the image.

(7) It becomes possible not only to output an image having a desired density from the original image, but also to output plural types of images, having output densities being different each other, without repeating the rereading operations for every image.

(8) It becomes possible to reflect inclination of the block, which would disappear when the resolution of the binary-coded image data is converted to the output-image resolution, onto the other blocks residing in the periphery of the block. Therefore, it is possible to perform the resolution conversion processing with little deteriorating the density distribution in the output image, resulting in an improvement of the quality of the output image.

(9) It becomes possible to vary the output image, by changing the error diffusion method to be employed for binary-coding the blocks corresponding to the output-image resolution and the reading mode.

Disclosed embodiment can be varied by a skilled person without departing from the spirit and scope of the invention.

What is claimed is:

1. A multifunction apparatus, having a plurality of various functions including at least a copy function, comprising:

an image-reading device to read an original image residing on a document so as to convert the original image into image data thereof;

a binary image data generating section to generate binary image data by applying a binary-coding processing to the image data read from the original image;

an image-data storing section to store the image data, read from the original image, or the binary image data, generated by the binary image data generating section, therein;

a designating section to designate a specific function among the plurality of various functions as an outputting function;

a resolution setting section to set an output-image resolution, based on an output resolution of the outputting function designated by the designating section;

a resolution converting section to convert a resolution of either the image data or the binary image data, stored in the image-data storing section, to the output-image resolution set by the resolution setting section; and a reading mode selecting section to select a specific reading mode, which corresponds to a feature of the original image, from a plurality of various reading modes provided in advance;

wherein, based on a ratio of the resolution of either the image data or the binary image data, stored in the image-data storing section, and the output-image resolution set by the resolution setting section, the resolution converting section divides either the image data or the binary-coded image data into a plurality of pixel blocks, and then, converts the resolution of either the image data or the binary image data to the output-image resolution in such a manner that either the image data or the binary image data is binary-coded by comparing a value based on a rate of black pixels residing in each of the plurality of pixel blocks, with a reference value, and at the same time, changes the reference value corresponding to the specific reading mode.

2. The multifunction apparatus of claim 1, further comprising:

a resolution selecting section to select a specific output resolution out of a plurality of output resolutions established in advance;

wherein the resolution setting section sets the output-image resolution, based on the specific output resolution selection by the resolution selecting section, instead of the output resolution of the outputting function designated by the designating section.

3. The multifunction apparatus of claim 1, wherein the plurality of various reading modes, provided in the reading mode selecting section, includes such a reading mode that is selectable corresponding to at least either a halftone image or a binary-coded image, and the image-reading device performs an image-reading operation based on the specific reading mode selected by the reading mode selecting section.

4. The multifunction apparatus of claim 1, further comprising:

an output-density setting section to set an output density of the outputting function designated by the designating section;

wherein the resolution converting section sets the reference value, corresponding to the output density set by the output-density setting section.

5. The multifunction apparatus of claim 1, wherein the resolution converting section employs an error diffusion method for converting the resolution of either the image data or the binary image data to the output-image resolution.

6. The multifunction apparatus of claim 5, wherein, when the reading mode selecting section selects the specific reading mode, the resolution converting section employs an error diffusion method for converting the resolution of either the image data or the binary image data to the output-image resolution.

7. A method for conducting an image processing in a multifunction apparatus, which has a plurality of various functions including at least a copy function, the method comprising:

reading an original image residing on a document so as to convert the original image into image data thereof;

generating binary image data by applying a binary-coding processing to the image data read from the original image;

storing the image data, read from the original image or the binary image data, generated in the generating step, into an image-data storing section;

designating a specific function among the plurality of various functions as an outputting function;

setting an output-image resolution, based on an output resolution of the outputting function designated in the designating step;

converting a resolution of either the image data or the binary image data, stored in the image-data storing section, to the output-image resolution set in the setting step; and selecting a specific reading mode, which corresponds to a feature of the original image, from a plurality of various reading modes provided in advance;

wherein, based on a ratio of the resolution of either the image data or the binary image data, stored in the image-data storing section, and the output-image resolution set by the resolution setting section, either the image data or the binary-coded image data are divided into a plurality of pixel blocks, and then, the resolution of either the image data or the binary image data is converted to the output-image resolution in such a manner that either the image data or the binary image data is binary-coded by comparing a value based on a rate of black pixels residing in each of the plurality of pixel blocks, with a reference value, and at the same time, the reference value is changed corresponding to the specific reading mode.

8. A computer-readable medium that stores a computer program to be executed for conducting an image processing in a multifunction apparatus, which has a plurality of various functions including at least a copy function, wherein the computer program comprises the functional steps of:

reading an original image residing on a document so as to convert the original image onto image data thereof;

generating binary image data by applying a binary-coded processing to the image data read from the original image;

storing the image data, read from the original image or the binary image data, generated in the generating step, into an image-data storing section;

designating a specific function among the plurality of various functions as an outputting function;

setting an output-image resolution, based on an output resolution of the outputting function designated in the designating step;

converting a resolution of either the image data or the binary image data, stored in the image-data storing section, to the output-image resolution set in the setting step; and selecting a specific reading mode, which corresponds to a feature of the original image, from a plurality of various reading modes provided in advance; and wherein, based on a ratio of the resolution of either the image data or the binary image data, stored in the image-data storing section, and the output image resolution set by the resolution setting section, either the image data or the binary-coded image data are divided into a plurality of pixel blocks, and then, the resolution of either the image data or the binary image data is converted to the output-image resolution in such a manner that either the image data or the binary image data is binary-coded by comparing a value based on a rate of black pixels residing in each of the plurality of pixel blocks, with a reference value, and at the same time, the reference value is changed corresponding to the specific reading mode.

* * * * *